United States Patent [19]

Moore, Jr.

[11] 4,304,588

[45] Dec. 8, 1981

[54] FOLIAR FEED COMPOSITIONS

[76] Inventor: William P. Moore, Jr., 408 Woodland Rd., Hopewell, Va. 23860

[21] Appl. No.: 146,950

[22] Filed: May 5, 1980

[51] Int. Cl.$^3$ .............................................. C05C 9/02
[52] U.S. Cl. ........................................... 71/28; 564/3
[58] Field of Search ........................... 71/28, 30, 64 C; 260/553, 555; 71/64.8, 64.1

[56] References Cited

U.S. PATENT DOCUMENTS 3,092,486 6/1963 Wates et al. ............................ 71/30
3,661,985 5/1972 Cluzel et al. ..................... 260/555 C

OTHER PUBLICATIONS

Derwent Abstract, 15094W/09, Sumitomo, UF Resin Prep.-U-F Reactants Polycondensed in Presence of Bicarbonate Salt.
CA-88-189071e, Belenavicius et al., Study of Ammonia Absorption & Prod. of Fertilizers From HTA Solutions.

*Primary Examiner*—S. Leon Bashore
*Assistant Examiner*—Ferris H. Lander

[57] ABSTRACT

Storage-stable, concentrated aqueous solution of nitrogenous compounds consisting essentially of urea and monomethylol urea singularly suited for the foliar feeding of plants. Upon application to a plant the urea content of the solution is quickly available for feeding purposes. The acid nature of the plant substrate in turn serves to counteract the built-in alkaline buffering capacity of the plant food solution thereby facilitating progressive condensation of the applied methylol urea. The resultant partial condensates are subject to microbial degradation in time thereby providing assimilable nitrogen for the ongoing feeding of the plant.

3 Claims, No Drawings

FOLIAR FEED COMPOSITIONS

BACKGROUND OF THE INVENTION

1. Field of the Invention

This invention relates to a process for the preparation of urea-formaldehyde based fertilizer compositions for the foliar feeding of plants.

2. Description of the Prior Art

Fertilizers containing nitrogenous compounds capable of releasing their nitrogen content by microbial action for the feeding of plants, particularly turf grass, have been extensively utilized for many years. Besides extending the feeding process over a period of time, a further important advantage afforded by this type of fertilizer is the freedom from burn damage to the plant even when the fertilizer is applied under unfavorable climatic conditions. The first commercial fertilizers of this type were derived from organic waste products such as the sludge produced in an industrial sewage treatment operation. These products, however, commonly suffer in that they are objectionably odorous, tend to be dusty and possess a very low nitrogen content.

By far the predominant bulk of the so-called slow release fertilizers being marketed currently are granular products wherein the nitrogen content is in the form of the partial condensates of urea and formaldehyde. The general method for preparing these condensates consists of initially effecting the formation of mono- and dimethylol ureas under relatively high basicity conditions followed by reacting the methylol ureas under acid conditions to promote the formation of methylene urea polymers. Products of this type by nature of the underlying condensation reaction inevitably contain free urea which in the fertilization process is quickly available for feeding purposes. Thus, there is no substantial lag period in the feeding process as experienced in the use of the natural organic products. The lower methylene urea polymers, on the other hand, while initially water insoluble degrade in time by microbial action to generate assimilable nitrogen compounds. The foremost difficulty experienced in preparing such fertilizer compositions in a commercial sense is that of limiting the formation of the high molecular weight methylene urea polymers. The higher methylene urea polymers are essentially inert components in that only an exceedingly small percentage of their nitrogen contents ever become available for feeding purposes.

As indicated, the urea-formaldehyde based fertilizers have been primarily developed for use in a solid form. Therefore, the utilization of such materials for foliar feeding applications has hitherto been essentially a compromise proposition. In this connection it has been proposed to employ aqueous suspensions of the urea-formaldehyde partial condensation products for this purpose. However, this approach gives rise to a number of problems. For one, a stable suspension having a reasonably high nitrogen content; e.g., 10–12%, is difficult to prepare. Moreover, the slow release components of the fertilizing composition exists in the form of particulates which are prone to be washed off or otherwise removed from the plant before degradation to assimilable compounds occurs. Even when the particulates remain adhered to the plant foliage during the degradation cycle, the resultant feeding sites are too scattered in distribution for the most effective feeding of the plant by this means.

The foremost object of this invention is accordingly that of designing a urea-formaldehyde fertilizer composition adapted for the foliar feeding of plants which substantially obviates the problems and disadvantages existing with the prior art practices in this regard.

SUMMARY OF THE INVENTION

In accordance with the present invention a process is provided for preparing a storage-stable, concentrated aqueous solution of nitrogenous compounds especially effective for the foliar feeding of plants. The nitrogenous compounds are derived from the reaction of urea with formaldehyde in a manner whereby the resultant product consists essentially of monomethylol urea, a small amount of monomethylene diurea, and unreacted urea, the latter amounting to a minor proportion of the urea employed in effecting the condensation reaction.

The contemplated condensation reaction is carried out in the presence of an alkaline buffering catalyst and utilizes a substantial proportion of said aldehydric reactant in a form as hexamethylene tetraamine. The foregoing aspects of the process in combination with the reaction temperature conditions applicable, not only govern the constitution of the desired product but additionally serve to impart storage-stability characteristics to the resultant solution. The type and amount of catalyst employed in accordance with this invention collectively has an important ancillary effect in regard to the use of the resultant reaction product for foliar feeding applications. The built-in alkaline buffering capacity of the product resulting in this manner is counteracted by the normally acidic plant substrate thereby facilitating partial progressive condensation of the methylol urea to lower molecular weight methylene urea polymers for extended feeding of the plant. The methylol urea not so affected, as well as the free urea present, readily provides assimilable nitrogen for the plant.

DESCRIPTION OF THE PREFERRED EMBODIMENTS

The process contemplated herein for preparing fertilizer compositions is relatively facile and lends itself particularly to a continuous method for producing the product. Both batch and continuous processing will be exemplified in the working examples presented hereinbelow. Basically the process consists of combining all of the reactants, heating to an elevated reaction temperature and holding thereat until the reactions are complete to the extent herein specified. The starting reaction mixture, in accordance with the best mode, consists of an aqueous solution of formaldehyde and urea wherein these reactants are present in the respective amounts to provide a nitrogen content of from about 20 to 30% and more preferably, from 23 to 30%.

The formaldehyde is employed as an aqueous solution thereof in which form it is commercially marketed. The urea can be in solid form or likewise an aqueous solution thereof. The applicable molar ratios of urea to formaldehyde is from 1.4 to 1.9 and more preferably from 1.5 to 1.7. A requirement of the present process is that of having a portion of the formaldehyde present in the form of hexamethylene tetramine. Expressed in terms of the total aldehydric content of the reaction mixture, the formaldehyde in combined form is from 15 to 50 mole percent thereof. More preferably, the combined formaldehyde is present in the order of from 20 to 30 mole percent on the foregoing basis. The hexamethylene tetraamine can be added as such to the reaction mixture or formed in situ prior to charging the urea. The in-situ procedure will be exemplified in a working example.

An important feature of the present invention is that of effecting the reaction of the urea with formaldehyde in the presence of an alkali metal carbonate catalyst. The preferred alkali metals are sodium and potassium with especial preference for sodium for economy reasons. While the carbonate salts of the indicated metals are preferred, the corresponding bicarbonate salts are also suitable. In the practice of the present invention it is contemplated that all of the selected catalyst be initially present in the reaction mixture. Thus, in the manner one can avoid the troublesome periodic addition of the catalyst as occasioned in the use of a strong alkali. The amount of alkali metal carbonate catalyst capable of maintaining the requisite basicity conditions throughout the course of the reaction is expressed in terms of the molar ratio of catalyst to formaldehyde (free and combined) present in the reaction mixture. On this basis the broad range is from 0.03–0.10 whereas the preferred range is from 0.05–0.07. By structuring the basicity conditions of the reaction mixture in this manner, the formation of alkali formate during course of reaction is controlled within desired limits. The resultant product, due to the presence of residual alkali metal carbonate and the generated alkali metal formate, possesses a sufficient degree of buffering capacity so that the solution exhibits extended storage stability characteristics. Furthermore, this buffering capacity is inherently tailored so that upon applying the fertilizer solution to a plant or soil the normally acidic nature of such substrates serve to counteract this buffering capacity thereby facilitating progressive condensation of the methylol urea present.

Upon combining the various reactants in a manner hereinabove described, the reaction mixture is rapidly heated with agitation to a temperature between 85 to 95° C., more preferably from 87 to 93° C., and held at the selected temperature until completion of the reaction. The indicated reaction conditions are observed until at least 50% of the urea has reacted accompanied by substantially complete reaction of the free and combined formaldehyde. In any attempt to react substantially more than 60% of the urea, the concomitant formation of methylene diurea becomes a limiting factor on solution storage stability. Thus the reaction is not to be carried beyond the point leading to the formation of in excess of about 5% methylene urea based on the total weight of the reaction mixture including the aqueous portion.

EXAMPLE I

This example illustrates a batch method for preparing a foliar feed composition of this invention. To a stirred, jacketed, stainless steel reactor having a 5000 gallon capacity and internal cooling coils, were added the indicated ingredients:

| Ingredients | Amount, pounds |
| --- | --- |
| Water | 9215 |
| $Na_2CO_3$ | 1750 |
| Hexamethylene Tetramine | 2350 |
| Urea | 26300 |
| Formaldehyde Solution, 50% Aqueous | 10385 |
| | 50000 |

The mixture was agitated vigorously and heating was started. The solution contained undissolved solids until the temperature of the reaction mixture reached 49° C., where it becomes completely clear with all ingredients dissolved. Heating of the well agitated reaction mixture was continued until the reaction temperature reached 88° C. after 45 minutes heating time. Heating was suspended and cooling water was applied to the reactor jacket to maintain temperature between 88° and 92° C. Cooling was required for 15 minutes to hold the temperatures in the desired range and afterwards essentially no cooling, and little heat, was required to maintain reaction temperature between 88° and 92° C. Reaction temperature was held in that range for a total of 80 minutes. Temperature was then rapidly decreased by application of maximum cooling, reaching 40° C. after 60 minutes.

During the period of the reaction, formic acid was formed from the formaldehyde and was neutralized as it formed by reaction with the sodium carbonate in the mixture, decreasing pH until it reached the sodium bicarbonate level of neutralization at pH 9.6 to 8.8. Carbon dioxide evolution proceeded from that point on and the pH of reaction mixture remained about constant thereafter. An alkaline base-buffer of sodium formate and sodium carbonates was thus formed.

After cooling, the reactor was discharged to a storage tank and analyzed. Composition of the resultant product follows:

| | Wt. % |
| --- | --- |
| Hexamethylene Tetramine | 1.7 |
| Monomethylol Urea | 35.8 |
| Monomethylene Diurea | 4.0 |
| Urea | 25.1 |
| Ammonia | 1.5 |
| Methyl Alcohol | 1.0 |
| Sodium Formate | 2.2 |
| Sodium Bicarbonate | 2.8 |
| Water | 25.9 |
| | 100.0 |

EXAMPLE II

This example illustrates the continuous production of a foliar feeding solution of this invention using a multi-stage backmix reactor system wherein the hexamethylene tetramine and the base-buffering alkali metal carbonates are formed "in-situ".

The reaction system consisted of five stirred, stainless steel, closed reactors operating in series so that the effluent from the first reactor was fed to the bottom of the second reactor. The flow continued in this manner until it overflowed from the fifth reactor through a product cooler to a storage tank. Each reactor was equipped for heating through internal coils, jackets, and heat exchangers. The first three reactors were equipped with internal coils for water cooling. The volume of reactors was 100, 200, 120, 200, and 100 gallons, respectively, for a total volume of 720 gallons.

The reaction system was started with the first reactor filled with water at 100° C. and the remaining reactors empty. All of the reactants were fed continuously to the first reactor and the remaining reactors were brought on line as the reaction mixture overflowed from one reactor to the next through the system. The reactants were started to the first reactor in the order as follows: anhydrous ammonia, carbon dioxide, sodium hydroxide (50% aqueous), urea solution, and formaldehyde. The agitation in the first and subsequent reactors, was vigorous enough to provide essentially instantaneous and complete mixing of all ingredients.

The heat release in the first reactor because of the formation of hexamethylene tetramine and dimethylol urea was very strong, and required maximum water cooling. There was some further heat release in reactor 2 requiring less cooling. The reaction in the remaining reactors required the addition of small amounts of heat and no cooling. Temperatures in reactors 1, 2, 3, 4 and 5 were 90°, 90°, 89°, 94° and 93° C. after the reaction system was brought to a steady state in 3 hours operations.

Feed rates of reactants fed continuously to the first reactor at steady state conditions were as follows:

| Reactants | Feed Rates, lb/hr |
|---|---|
| Anhydrous Ammonia | 167.7 |
| Urea Liquor, 90% | 4280.0 |
| Carbon Dioxide, gas | 158.9 |
| Caustic Soda Solution, 50% NaOH | 384.9 |
| Formaldehyde Solution, 50% HCHO | 2407.5 |
| Total | 7399.0 |

The reactions occurring in the first reactor were that of the formation of sodium carbonate, hexamethylene tetramine, dimethylol urea, small amounts of monomethylol urea, and smaller amounts of methylene diurea and miscellaneous monomeric urea-formaldehyde compounds. All formaldehyde and ammonia was completely reacted in the first reactor, with no free ammonia or formaldehyde remaining in its effluent. In the remaining reactors, the formaldehyde content of the system was redistributed to form primarily monomethylol urea and some additional methylene diurea with the dimethylol urea content becoming substantially nil.

The reaction pH remained nearly constant throughout the reaction system as stabilized by the absorption of carbon dioxide in the first reactor and the desorption of carbon dioxide in the last two reactors caused by the formation of sodium formate.

Samples were withdrawn from each reactor overflow and analyzed. Results are tabulated as follows:

| Reactor No. | Sp. Gr., at 27° C. | pH |
|---|---|---|
| 1 | 1.271 | 10.2 |
| 2 | 1.270 | 9.7 |
| 3 | 1.270 | 9.3 |
| 4 | 1.269 | 8.9 |
| 5 | 1.269 | 8.8 |

The composition of the effluent from the first reactor was determined by chemical and liquid chromatographic methods to be as follows:

| Components | Wt. % |
|---|---|
| Ammonia | 0.0 |
| Hexamethylene Tetramine | 4.7 |
| Formaldehyde | 0.0 |
| Monomethylol Urea | 15.0 |
| Monomethylene Diurea | 0.6 |
| Sodium Carbonate | 3.5 |

-continued

| Components | Wt. % |
|---|---|
| Carbon Dioxide | 0.7 |
| Dimethylol Urea | 13.2 |
| Urea | 35.4 |
| Water (by difference) | 26.9 |

The free carbon dioxide and the carbon dioxide formed by the reaction of formic acid with sodium carbonate to produce sodium formate and sodium bicarbonate were separated from the effluent of the last reactor. The cooled product was recovered at a continuous rate of 7290 pounds per hour and a composite sample was analyzed to determine composition. The results obtained were as follows:

| Component | Wt % |
|---|---|
| Hexamethylene Tetramine | 2.9 |
| Ammonia | 0.9 |
| Sodium Bicarbonate | 2.8 |
| Sodium Formate | 2.1 |
| Methyl Alcohol | 1.1 |
| Methylene Diurea | 3.3 |
| Monomethylol Urea | 31.1 |
| Dimethylol Urea | 0.2 |
| Urea | 28.8 |
| Water (by difference) | 26.8 |

Total nitrogen content was 26.3% (wt) and salt out temperature was −15° C. Appearance of produce was clear, water white. Kinematic viscosity was 31 centipose at 25° C. Product remained clear and water white after 3 months storage at ambient temperature of about 25° C. and pH remained at 8.9 throughout the storage period. A sample was stored at 53° C. for 30 days and remained clear throughout the accelerated test period.

What is claimed is:

1. A process for the preparation of a storage-stable concentrate of water-soluble nitrogenous compounds for the foliar feeding of plants which comprises reacting at a temperature between 85° and 95° C. an aqueous solution of urea and formaldehyde containing from about 20–30% nitrogen content in the presence of an alkaline buffering catalyst consisting of an alkali metal carbonate, and hexamethylene tetraamine, wherein, the molar ratio of alkali metal carbonate to formaldehyde is between 0.03 and 0.10, and between 15 and 50 mole percent of the formaldehyde is in the combined form as hexamethylene tetraamine and the molar ratio of urea to formaldehyde is between 1.4 and 1.9; maintaining said reaction temperature until at least 50% of the urea and substantially all of the free and combined formaldehyde has reacted to form methylol urea compounds, with the formation of monomethylene diurea not to exceed about 5% of the reaction mixture; whereby, pH is maintained between 8.5 and 10.5 to allow reaction of urea and formaldehyde to form storage-stable, water-soluble nitrogenous compounds which are not phytotoxic to plants.

2. The product prepared in accordance with claim 1.

3. A continuous multistage process for the preparation of a storage-stable concentrate of water-soluble nitrogenous compounds for the foliar feeding of plants which comprises reacting at temperatures between 85° and 95° C. an aqueous solution of urea and formaldehyde containing from about 23 to 30% nitrogen content in the presence of an alkaline buffering catalyst consisting of an alkali metal carbonate, and hexamethylene tetraamine, wherein the molar ratio of alkali metal carbonate to formaldehyde is between 0.05 and 0.07, between 20 and 30 mole percent of the formaldehyde is in the combined form as hexamethylene tetraamine, and the molar ratio of urea to formaldehyde is between 1.5 and 1.7; maintaining said reaction temperatures and alkaline buffering as the reactants continuously flow through each of a plurality of agitated reactors operated in series to convert at least about 50% of the urea and substantially all of the free and combined formaldehyde to methylol urea compounds with the formation of monomethylene diurea limited to about 5% of the reaction mixture; whereby, pH is maintained between 8.5 and 10.5 to allow reaction of urea and formaldehyde to form storage-stable, water-soluble nitrogenous compounds which are not phytotoxic to plants.

* * * * *